(12) United States Patent
Chen

(10) Patent No.: US 7,084,610 B2
(45) Date of Patent: Aug. 1, 2006

(54) ALTERNATOR RECTIFIER

(75) Inventor: Hanyang Ben Chen, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 56 days.

(21) Appl. No.: 11/001,746

(22) Filed: Dec. 2, 2004

(65) Prior Publication Data

US 2005/0146309 A1     Jul. 7, 2005

Related U.S. Application Data

(60) Provisional application No. 60/534,561, filed on Jan. 6, 2004.

(51) Int. Cl.
*H20P 9/00* (2006.01)
*H01L 29/10* (2006.01)

(52) U.S. Cl. .................... 322/28; 322/25; 322/27; 363/132

(58) Field of Classification Search .............. 322/24, 322/25, 27, 28, 37; 363/132, 125
See application file for complete search history.

(56) References Cited

U.S. PATENT DOCUMENTS

| | | | |
|---|---|---|---|
| 3,488,560 A | 1/1970 | Konopa | |
| 3,581,150 A | 5/1971 | Kirk et al. | |
| 3,593,102 A | 7/1971 | Kawashima | |
| 3,835,367 A | 9/1974 | Wiley | |
| 3,931,546 A | 1/1976 | Jakobs et al. | |
| 4,040,115 A | 8/1977 | Gruson | |
| 4,380,727 A | 4/1983 | Gray | |
| 4,459,631 A | 7/1984 | McNamee | |
| 5,285,344 A | 2/1994 | Heitzmann | |
| 5,508,874 A | 4/1996 | Williams et al. | |
| 5,604,653 A * | 2/1997 | Pezzani et al. | ............... 361/20 |
| 5,608,616 A * | 3/1997 | Umeda et al. | .............. 363/132 |
| 5,780,996 A * | 7/1998 | Kusase et al. | ................ 322/28 |
| 5,808,451 A * | 9/1998 | Endou et al. | ................. 322/24 |
| 6,049,198 A * | 4/2000 | Schenk | ........................ 322/90 |
| 6,111,768 A * | 8/2000 | Curtiss | ........................ 363/98 |
| 6,731,081 B1 * | 5/2004 | Kusase et al. | ............. 318/140 |

* cited by examiner

*Primary Examiner*—Nicholas Ponomarenko
(74) *Attorney, Agent, or Firm*—Brinks Hofer Gilson & Lione

(57) ABSTRACT

An alternator for a motor vehicle includes a current generation device and a rectifier. The current generation device has multiple phase stator windings in which AC currents are generated. The rectifier is connected to the windings of the current generation device. The rectifier includes multiple sets of first and second diodes for the multiple phase windings. At least one of the first and second diodes of each set is a Schottky diode. A voltage clamping device is connected to the rectifier to protect the Schottky diodes from surge reverse voltage.

24 Claims, 2 Drawing Sheets

ALTERNATOR RECTIFIER

CROSS-REFERENCE TO RELATED PATENT APPLICATIONS

This patent application claims the benefit of U.S. provisional patent application 60/534,561, filed Jan. 6, 2004.

FIELD OF THE INVENTION

The present invention relates generally to an alternator for a motor vehicle, and more particularly relates to an alternator having a rectifier which includes Schottky diodes as rectifying elements.

BACKGROUND OF THE INVENTION

The electrical charging system of a typical motor vehicle includes an alternator for generating AC currents, a rectifier to convert these AC currents into a DC current to support the electric loads in the vehicle, as well as to charge the battery. Conventionally, P/N junction diodes are employed as rectifying elements because they provide high current throughput as well as high temperature capability, which makes these diodes well suited for the harsh environment of a motor vehicle.

The forward voltage drop of a P/N junction diode is about 1 volt and the total voltage drop of the rectifier is about 2 volts, resulting in approximately 8–10% of the inputted energy from the alternator being lost in these diodes through heat dissipation. In recent years, the design of Schottky diodes has dramatically improved, such that their current capacity, size, and maximum temperature limit are becoming comparable with P/N junction diodes. Unlike convention P/N junction diodes, Schottky diodes have a much lower forward voltage drop; generally about 45–80% less than a conventional P/N junction diode. Thus, the use of Schottky diodes in a rectifier as rectifying elements can increase alternator efficiency, increase output current at engine idle speed, and reduce heat dissipation.

Unfortunately, the conditions experienced by a vehicle alternator and rectifier limits the ability to use Schottky diodes as rectifying elements. First, Schottky diodes have a maximum allowable reverse voltage that is much lower than conventional P/N junction diodes. At a vehicle load dumping condition, when the vehicle electric load is disconnected instantly, a surge reverse voltage is imposed on the rectifier, which in most vehicles is about 100 volts or higher. The Schottky diodes can be damaged or their characteristics deteriorated after experiencing such a surge reverse voltage. Second, Schottky diodes exhibit a large reverse leakage current mainly at high temperature conditions which are often found in the motor vehicle environment. The reverse leakage currents, depending on their size, could discharge the vehicle battery in a couple of weeks, several days, or even sooner.

Accordingly, there exists a need to provide an alternator and rectifier employing Schottky diodes to increase efficiency and reduce heat dissipation, while at the same time protecting the Schottky diodes from surge reverse voltages and preventing the Schottky diodes from permitting reverse leakage currents.

BRIEF SUMMARY OF THE INVENTION

One embodiment of the present invention provides an alternator for a motor vehicle, the alternator generally comprising a current generation device, a rectifier, and a voltage clamping device. The current generation device has multiple phase windings in which AC currents are generated. The rectifier is connected to the windings of the current generation device. The rectifier includes multiple sets of first and second diodes for each phase of the multiple phase windings. At least one of the first and second diodes of each set is a Schottky diode. The voltage clamping device is connected in parallel to the entire rectifier. Generally, the voltage clamping device can clamp transient surge voltage to a rated value by allowing a large current to flow in its reverse direction According to more detailed aspects, the voltage clamping device is not connected directly to the multiple phase windings of the current generation device. The voltage clamping device is preferably a voltage regulation diode that has a rated clamping voltage that is less than or equal to the maximum allowable reverse voltage of each Schottky diode. For example, the rated clamping voltage of the voltage regulation diode is in the range of 18–30 volts, and the maximum allowable reverse voltage of each Schottky diode is in the range of 30–45 volts. The voltage regulation diode is a TVS (Transient Voltage Suppressor, typically called a zenor diode), or alternately may be a MOV (Metal Oxide Varistor), or other transient voltage clamping device. Each Schottky diode does not have a voltage regulation diode formed therein or integrally formed therewith.

The alternator is electrically connected to a power source line and a battery, the voltage clamping device being connected to the power source line. The rectifier is connected to the power source line, and the voltage clamping device is connected in parallel to the rectifier. In one version, the first and second diodes of each set are both Schottky diodes. In another version, the first diodes are connected to the high potential side (i.e. the terminal of the battery) and the second diodes are connected to the low potential side (i.e. the ground), and the second diodes of each set are not Schottky diodes. Here, the second diodes of each set are either P/N junction diodes or voltage regulation diodes. In yet another version, the voltage clamping device includes a first voltage regulation diode and a second voltage regulation diode. The first and second voltage regulation diodes form a portion of the rectifier by forming one set of first and second diodes. The first and second voltage regulation diodes are connected to the high potential side and low potential side, respectively, of less than all the phases of the multiple phase windings. The remaining sets of first and second diodes of the rectifier are connected to the remaining phases of the multiple phase windings.

Another embodiment of the present invention provides a rectifier for an alternator of a motor vehicle. The alternator includes a current generation device having multiple phase windings in which a current is generated. The rectifier generally comprises multiple sets of first and second diodes for each phase of the multiple phase windings, as well as a voltage regulation diode. Each set of first and second diodes are connected to a phase of the windings of the current generation device. At least one of the first and second diodes of each set are a Schottky diode. The voltage regulation diode is connected in parallel to each set of first and second diodes. The voltage regulation diode is not connected directly to the multiple phase windings of the current generation device.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
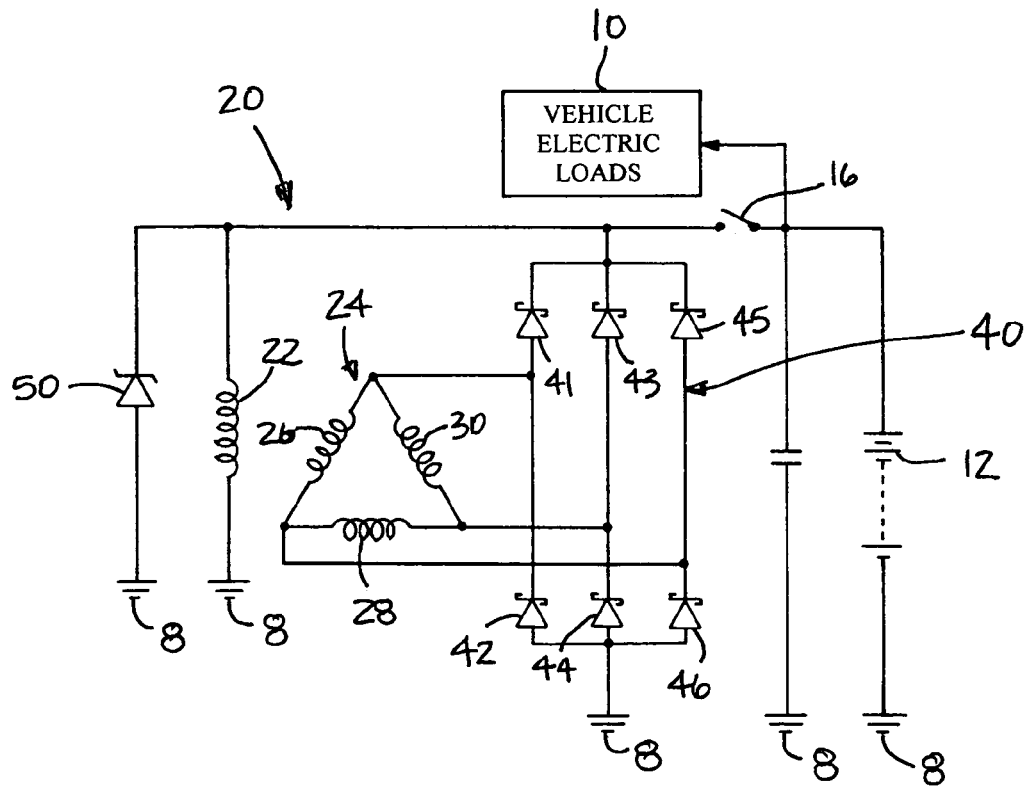
FIG. 1 is a circuit diagram illustrating the alternator and rectifier constructed in accordance with the teachings of the present invention.

Turning now to the figures, FIG. 1 depicts a circuit diagram of an alternator 20 and rectifier 40 constructed in accordance with the teachings of the present invention. The alternator 20 generally includes a current generation device comprising a rotor coil 22 for producing a magnetic field in a rotor, and a stator winding 24 having multiple phase windings 26, 28, 30 in which AC currents are generated. The alternator stator windings 24 have been shown connected in a delta-type connection, but will be recognized by those skilled in the art that the winding phases 26, 28, 30 may be connected in any known manner, such as a wye-type connection. Similarly, three phases 26, 28, 30 have been shown but will be recognized that the alternator 20 may include more or less phases, including more recent six-phase designs with dual-delta or dual-wye connections.

The alternator 20 is connected through or includes a rectifier 40. The rectifier 40 includes multiple sets of first and second diodes for each phase of the stator winding 24, and specifically set 41, 42, set 43, 44, and set 45, 46. The system also usually includes a vehicle battery 12 and a capacitor 14 which are connected in parallel across a power source line PSL, as is known in the art. The vehicle electric loads 10 are connected to the battery 12, alternator 20 and rectifier 40 through the power source line PSL. Specifically, the unit comprised by the alternator 20 and rectifier 40 are connected in parallel to the capacitor 14 and battery 12 across the power source line PSL as well as in parallel to the rotor coil 22. The low potential side of all these elements is connected to a common ground 8. In FIG. 1 the power source line PSL is the high potential side of the battery and the ground is the low potential side of the battery.

The present invention permits the multiple sets of diodes forming the rectifier 40 to be constructed of Schottky diodes 41, 42, 43, 44, 45, 46. As noted above, Schottky diodes exhibit a lower forward voltage drop than a conventional P/N junction diode, and therefore increase efficiency and reduce heat dissipation of the alternator 20 and rectifier 40. Each set of first and second diodes includes upper-side diodes 41, 43, 45 which connect the alternator winding phases 26, 28, 30 to the power source line PSL, while diodes 42, 44, 46 are lower-side diodes that connect the alternator winding phases 26, 28, 30 to the ground 8.

In order to achieve the benefits of the lower forward voltage drop of the Schottky diodes 41, 42, 43, 44, 45, 46, the diodes are selected with a maximum allowable reverse voltage (or rated voltage) in the range of 30–45 volts. At typical load dumping conditions, when the vehicle electric load 10 is disconnected instantly, a reverse surge voltage can be produced in the range of 100 volts. Thus, to protect the Schottky diodes, 41, 42, 43, 44, 45, 46 from the surge reverse voltage, the electrical system of FIG. 1 includes a voltage clamping device 50 to protect the rectifier 40.

The voltage clamping device 50 has been depicted herein as a voltage regulation diode 50, also known as a TVS (Transient Voltage Suppressor) or zenor diode in vehicle alternator industry. However, it will be recognized by those skilled in the art that the voltage clamping device 50 could also comprise a Metal Oxide Varistor (MOV) or other voltage clamping device which can provide the same rated clamping voltage. The voltage regulation diode 50 has a rated clamping voltage that is less than or equal to the maximum allowable reverse voltage of each Schottky diode 41–46, and preferably selected between 18 and 30 volts. The ranges for the rated voltages of the voltage regulation diode 50 and the Schottky diodes 41–46 have been selected based on a vehicle with a 14 volt electric system, which is typically used for nearly all passenger automobiles today, but the ranges can be adjusted for electric systems of different voltages. The voltage regulation diode 50 is connected in parallel to the entire rectifier 40 across power source line PSL. It can be seen in FIG. 1 that the voltage regulation diode 50 is not connected directly to the multiple phase windings 26, 28, 30 of the alternator stator windings 24.

With the voltage regulation diode 50 in the electrical system of the alternator 20 and rectifier 40, the maximum reverse voltage on any of the Schottky diodes 41, 42, 43, 44, 45, 46 will not exceed the rated clamping voltage of the voltage regulation diode 50 plus the forward voltage drop of a single diode in the rectifier, which is typically about 1 volt or less. In other words, the surge reverse voltage applied on any one of the Schottky diodes 41, 42, 43, 44, 45, 46 is clamped by the voltage regulation diode 50. Therefore, these Schottky diodes are protected from high voltage deterioration and high voltage damage. According to this construction of the alternator 20, the output performance can be increased by about 10% to 15% at engine idle speed.

It will be recognized by those skilled in the art that the alternator 20 and rectifier 40 of the present invention provide high voltage protection to the Schottky diodes 41, 46 through use of a single zenor diode or other voltage clamping device 50 which eliminates the need to use specially formulated Schottky diodes with voltage protection capabilities, or use of a plurality of voltage protection diodes connected in parallel to each of the Schottky diodes 41, 42, 43, 44, 45, 46 in the rectifier 40.

It can also be seen in FIG. 1 that a switch 16 is provided between the rectifier 40 and the battery 12. The switch 16 can be a solenoid, a MOSFET, or any other kind of electrical switch known in the art. The switch 16 can be opened when vehicle engine is in non-operational condition or otherwise when the vehicle is turned off to prevent reverse leakage current through the Schottky diodes 41, 42, 43, 44, 45, 46 and prevent unwanted draining of the battery 12.

Another way to manage reverse leakage current is through the selection of the particular Schottky diodes 42, 42, 43, 44, 45, 46 of the rectifier 40. Certain types of Schottky diodes exhibit a lower reverse leakage current than other designs. Likewise, certain types of Schottky diodes exhibit lower forward voltage drops than other designs. For example, Schottky diodes fabricated using silicon as a base material have a low forward voltage drop. On the other hand, Schottky diodes fabricated using GaN or GaS as a base material have a lower reverse leakage current. Accordingly, the rectifier diodes 41, 43, 45 connected to the high potential side (i.e. upper-side diodes) may be selected to be a type of Schottky diode with lower forward voltage drops. At the same time, the Schottky diodes 42, 44, 46 connected to the low potential side (i.e. lower-side diodes) may be selected as selected of the type of Schottky diodes that exhibits lower reverse leakage currents. Since the upper-side Schottky diodes 41, 43, 45 are serially connected with the lower-side Schottky diodes 42, 44, 46. Leakage current in the rectifier 40 can be limited to acceptable level by the lower side Schottky diodes 42, 44, 46 to avoid unwanted discharge of the battery 12. It will also be recognized by those skilled in the art that the lower-side diode 42, 44, 46 can be selected to have of the type to exhibit lower forward voltage drop, while the upper-side diodes 41, 43, 45 can be selected from the type of Schottky diodes exhibiting lower reverse leakage current, to achieve the same affect.

Figure 2:
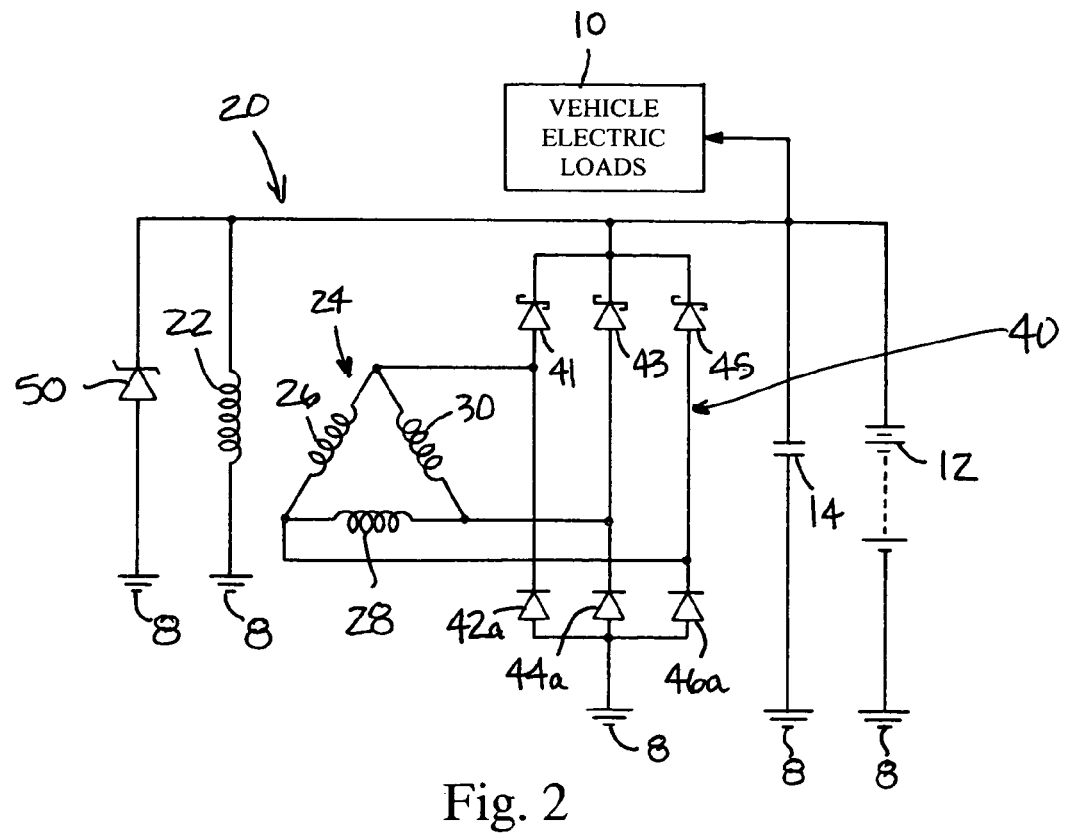
FIG. 2 is a circuit diagram illustrating an alternate embodiment of the alternator and rectifier depicted in FIG. 1.

Another embodiment of the alternator 20 and rectifier 40 has been depicted in FIG. 2. In this embodiment, the upper-side diodes 41, 43, 45, are all selected as Schottky diodes. However, the lower-side diodes 42a, 44a, 46a are not Schottky diodes, and are preferably conventional P/N junction diodes as shown. Using conventional P/N junction diodes as the lower-side diodes 42a, 44a, 46a allows rectifier 40 to make use of their very low reverse leakage currents which are provided for all temperatures up to 250° C., and thereby avoid unwanted discharge of the battery 12. It will also be recognized by those skilled in the art that the upper-side diodes 41, 43, 45 could be conventional P/N junction diodes and the lower-side diodes 42a, 44a, 46a Schottky diodes, in order to achieve the same effect. As with the prior embodiment, the voltage regulation diode 50 is connected only in parallel to the rectifier 40 through the power supply line PSL to protect the rectifier 40 and its diodes from high surge reverse voltages.

Figure 3:
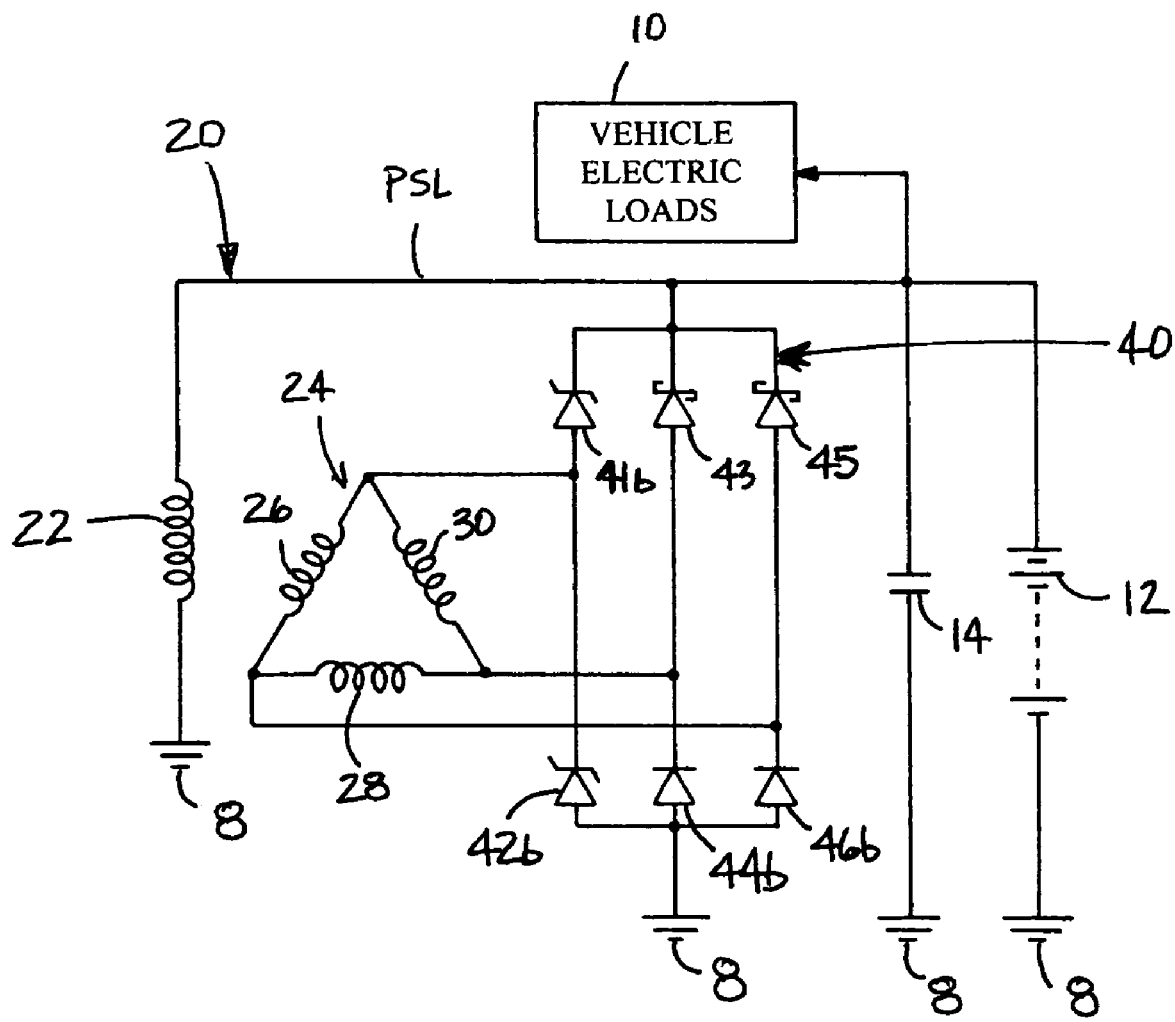
FIG. 3 is a circuit diagram illustrating yet another embodiment of the alternator and rectifier depicted in FIG. 1.

Yet another embodiment of the alternator 20 and rectifier 40 has been depicted in FIG. 3. In this embodiment, the protection against surge reverse voltages formerly provided by the voltage regulation diode 50 has been incorporated directly into the rectifier 40. In particular, at least one set of diodes for one phase of the alternator winding 24 are selected as voltage regulation diodes, which in FIG. 3 are shown as the set of diodes 41b, 42b. The remaining sets of diodes 43, 44, 45, 46 may be Schottky diodes, or alternately the upper-side diodes 43, 45 are selected as Schottky diodes, and the lower-side diodes 44b, 46b are selected as conventional P/N junction diodes, as shown. Still further, the remaining sets of diodes 43, 44, 45, 46 may be conventional P/N junction diodes. It will be recognized that by selecting the lower-side diodes 44b, 46b (or the upper-side diodes as described above) or all remaining diodes as conventional P/N junction diodes, reverse leakage currents through the rectifier 40 can be prevented to avoid draining the battery 12. At the same time, the first set of diodes 41b, 42b provide voltage protection to the remaining sets of diodes (i.e. the Schottky diodes), by having a rated clamping voltage that is less than or equal to the maximum allowable reverse voltage of each Schottky diode.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An alternator for a motor vehicle, the alternator comprising:
    a current generation device having multiple stator phase windings in which AC currents are generated;
    a rectifier connected to the windings of the current generation device; the rectifier including multiple sets of first and second diodes for each phase of the multiple phase windings, at least one of the first and second diodes of each set being a Schottky diode; and
    a voltage clamping device connected in parallel to the entire rectifier.

2. The alternator of claim 1, wherein the voltage clamping device is not connected directly to the multiple phase windings of the current generation device.

3. The alternator of claim 1, wherein the voltage clamping device is a MOV.

4. The alternator of claim 1, wherein the voltage clamping device is a voltage regulation diode.

5. The alternator of claim 1, wherein the voltage clamping device has a rated clamping voltage that is less than the maximum allowable reverse voltage of each Schottky diode.

6. The alternator of claim 1, wherein the rated clamping voltage of the voltage clamping device is in the range of 18 to 30 volts, and wherein the maximum allowable reverse voltage of each Schottky diode is in the range of 30 to 45 volts.

7. The alternator of claim 1, wherein each Schottky diode does not have a voltage clamping device formed therein.

8. The alternator of claim 1, the alternator being electrically connected to a power source line having a battery, and wherein the voltage clamping device is connected between the power source line and the ground.

9. The alternator of claim 1, wherein the first and second diodes of each set are both Schottky diodes.

10. The alternator of claim 9, wherein the first diodes have a lower forward voltage drop than the second diodes, and wherein the second diodes have a lower reverse leakage current capability than the first diodes.

11. The alternator of claim 10, wherein the second diodes are fabricated using GaN or GaS as a base material.

12. The alternator of claim 1, wherein each of the first diodes are connected to the high potential side of the battery, and each of the second diodes are connected to the low potential side of the battery, and wherein the first diodes of each set are Schottky diodes.

13. The alternator of claim 11, wherein the second diodes of each set are P/N junction diodes.

14. The alternator of claim 1, wherein the voltage regulation device comprises a first voltage regulation diode and a second voltage regulation diode, the first and second voltage regulation diodes forming a portion of the rectifier by forming one set of first and second diodes, the first and second voltage regulation diodes connected to the high potential side and low potential side of the battery, respectively, of less than all the phases of the multiple phase windings, the remaining sets of first and second diodes of the rectifier being connected to the remaining phases of the multiple phase windings.

15. The alternator of claim 1, wherein the alternator contains a claw-pole rotor.

16. A rectifier for an alternator of a motor vehicle, the alternator including a current generation device having multiple phase stator windings in which AC currents are generated, the rectifier comprising:

multiple sets of first and second diodes for each phase of the multiple phase stator windings, each set of first and second diodes being connected to an output terminal of the stator windings of the current generation device;

at least one of the first and second diodes of each set being a Schottky diode; and a voltage clamping device connected in parallel to each set of first and second diodes.

17. The rectifier of claim 16, wherein the voltage clamping device has a rated clamping voltage that is less than or equal to the maximum allowable reverse voltage of each Schottky diode.

18. The rectifier of claim 16, wherein each Schottky diode does not have a voltage regulation diode formed therein.

19. The rectifier of claim 16, the alternator being electrically connected to a power source line and a battery, the voltage clamping device being connected between the power source line and the ground.

20. The rectifier of claim 16, wherein the first and second diodes of each set are both Schottky diodes.

21. The rectifier of claim 16, wherein each of the first diodes are connected to the high potential side of the battery, and each of the second diodes are connected to the ground, and wherein the second diodes of each set are not Schottky diodes.

22. The rectifier of claim 16, further comprising a second voltage regulation diode, the first and second voltage regulation diodes forming a portion of the rectifier by forming one set of first and second diodes, the first and second voltage regulation diodes connected to the high potential side and low potential side, respectively, of less than all the phases of the multiple phase windings, the remaining sets of first and second diodes of the rectifier being connected to the remaining phases of the multiple phase windings.

23. The rectifier of claim 16, wherein, the voltage clamping device is a voltage regulation diode.

24. The rectifier of claim 16, wherein, the voltage clamping device is not connected directly to the multiple phase windings of the current generation device.

\* \* \* \* \*